United States Patent [19]

Jefferson

[11] 4,017,015
[45] Apr. 12, 1977

[54] DISPOSABLE BIODEGRADABLE ENVIRONMENTAL ANIMAL FECES WASTE SCOOP AND CONTAINER

[76] Inventor: Ray Jefferson, 494 Broome St., New York, N.Y. 10013

[22] Filed: Jan. 12, 1976

[21] Appl. No.: 648,646

[52] U.S. Cl. .............................. 229/19; 15/104.8; 229/39 R; 229/52 B; 294/1 R; 294/55

[51] Int. Cl.² ................................. B65D 5/38

[58] Field of Search ............ 294/1 R, 55; 15/257.1, 15/104.8; 229/9, 19, 52 B, 39 R; 220/8

[56] References Cited

UNITED STATES PATENTS

| 416,892 | 12/1889 | Blittersdorff | 229/9 |
|---|---|---|---|
| 2,613,867 | 10/1952 | Darr | 229/52 B X |
| 2,967,729 | 1/1961 | Davis | 294/5 S |
| 2,990,099 | 6/1961 | Ryder | 229/39 R |
| 3,536,225 | 10/1970 | Pech | 220/8 |
| 3,733,098 | 5/1973 | Tobias | 294/1 R X |
| 3,799,598 | 3/1974 | Lavaggi | 294/1 R |
| 3,857,597 | 12/1974 | Young | 294/1 R |
| 3,885,266 | 5/1975 | Nafziger | 294/1 R X |

Primary Examiner—Stephen P. Garbe
Attorney, Agent, or Firm—Richard L. Miller

[57] ABSTRACT

A pair of interfitting boxes made of biogradable cardboard and which used for scooping up animal feces from a floor, sidewalk or other surface; the boxes being collapsible so to conveniently be carried in a pocket or purse prior to use, and each box having an opening on one end, the opening having an edge contoured into a scoop so to scoop up the feces therebetween and the boxes then being slided into each other so to enclose the feces while the device is thus carried to a refuse receptacle for disposal.

1 Claim, 5 Drawing Figures

U.S. Patent        April 12, 1977        4,017,015
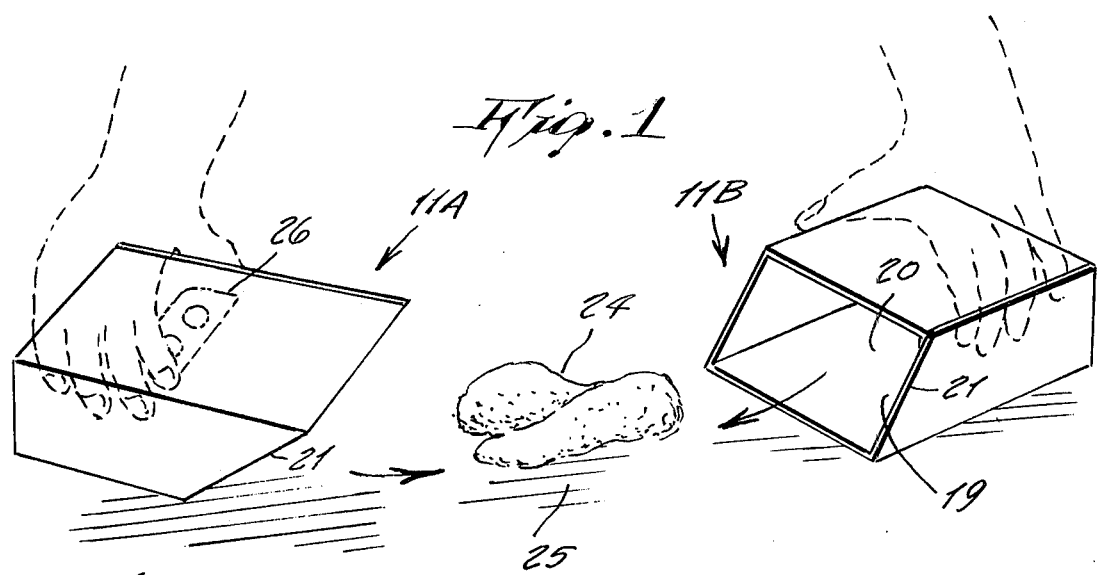
Fig. 1
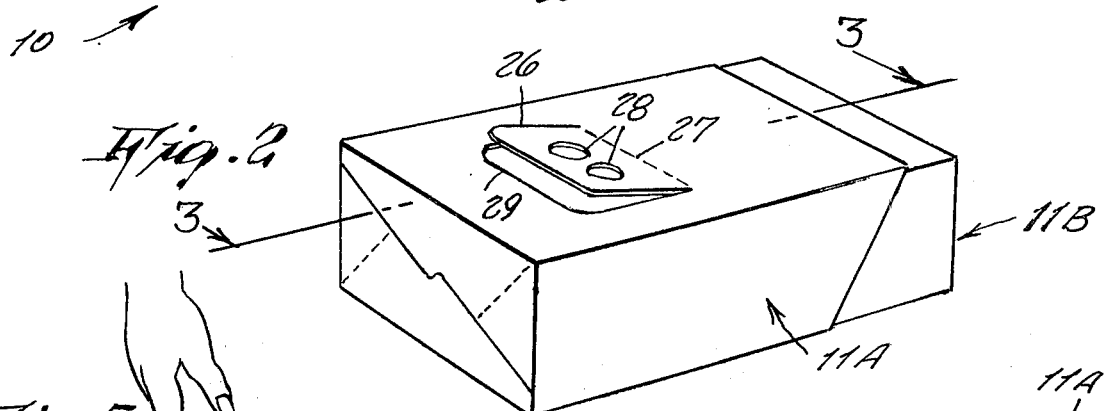
Fig. 2
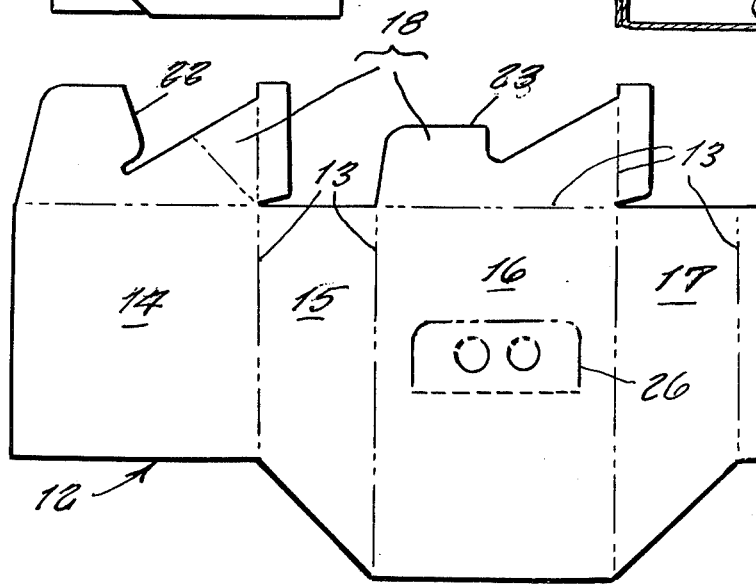
Fig. 5
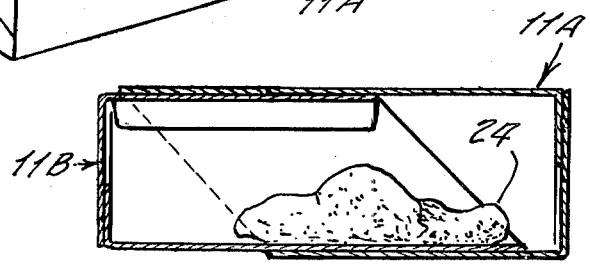
Fig. 3
Fig. 4

DISPOSABLE BIODEGRADABLE ENVIRONMENTAL ANIMAL FECES WASTE SCOOP AND CONTAINER

This invention relates generally to household pet equipment. More specifically it relates to sanitary accessories.

It is well known that many pets particularly such as young dogs occasionally have an accident by defecating upon a floor or carpet in a home, and a person must resort to use of newspaper or rags to wipe it up. However, this is not ideal because the waste thus is brought into close contact within a person's hand so that there is always a danger of the waste seeping therethrough. This situation is objectionable, and is therefore in want of an improvement.

Accordingly, it is a principal object of the present invention to provide a novel box device for scooping up and containing the waste so that a person's hands are thus not brought as closely to the feces.

Another object is to provide a scoop and container device made up of a pair of collapsible boxes so to be conveniently carried by a person while "walking" a dog out-of-doors, and thus be able to clean up any feces that a dog may have made upon a sidewalk, lawn, or the like.

Other objects are to provide a waste scoop and container which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention in position for scooping up a dog feces.

FIG. 2 shows the invention thereafter being closed so to enclose the animal waste.

FIG. 3 is a cross section on line 3—3 of FIG. 2.

FIG. 4 is a flat blank of die cut stock from which one of the boxed are folded up.

FIG. 5 shows the assembled invention being carried.

Referring now to the drawing in detail, the reference numeral 10 represents a disposable environmental animal feces waste scoop and container according to the present invention wherein the same consists of a pair of corrugated biodegradable cardboard boxes 11a and 11b that slidably interfit each other, each box being a same in design and shape.

Each box is made from a flat, contoured die cut blank 12 shown in FIG. 4 and which is folded up along fold lines 13, so to form a rectangular polyhedron having five side walls 14, 15, 16, 17 and 18 and having an opening 19 in one end thereof for providing access into an interior chamber 20 thereof. The edge 21 of the opening 19 is scoop shaped by means of wall 16 projecting furthest outwardly, which opposite wall 14 projects least, and side walls 15 and 17 have tapering edge contour therebetween. Wall 18 is formed by interfitting and interlocking tabs 22 and 23. As clearly shown in FIG. 4, the interlocking tabs 22 and 23 each includes a minor tab portion separated from a major tab portion thereof by a fold line 13 that is along a same line as the fold lines 13 that are located between the box side walls 14 and 15, and fold line 13 between box side walls 16 and 17.

While the device may be made in different sizes so to suit small or large pets, a practical size for average dogs would be 2¼ × 4¼ × 6½ inches maximum overall, while the shorter wall 14 is only 4¼ inches long.

Prior to use, the boxes are folded flat for storage or conveniently carrying in a pocket or purse while "walking" a dog.

In operative use, as shown in FIG. 1, one box is held in each hand, one box 11A being inverted, and with both boxes being placed upon opposite sides of a feces 24 with openings 19 facing the same, the box 11B having the wall 16 on the floor or ground 25 scoops up the feces and moves inside the other box, thus quickly and without any undue effect picking up the objectionable feces off the ground or floor and enclosing it sealed inside the interfitted boxes so that no odor comes out therefrom.

As shown in the Drawing, the boxes are completely alike except that one box 11A additionally includes a handle 26 die cut in its long wall 16. This side, thus perforated, is not suitable for being used to scoop up the feces such as the wall 16 of the box 11B. Therefore the box 11a is inverted so that in use, the wall 16 is on top, as shown in FIG. 1.

After the feces is scooped up as described, and the box 11B is slided inside the box 11A, the handle 26 is then bent upwardly around fold line 27. Two holes 28 die cut in the handle so to receive a person's fingers, while carrying the device as shown in FIG. 5, toward a refuse receptacle for being discarded. It should be noted that bending the handle upwardly does not expose the feces inside the boxes because the wall 14 of box 11B is closing the die cut hole 29 formed by the handle.

Thus a practical and useful device is provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a disposable, environmental, animal feces waste scoop and container, the combination of a pair of interfitting boxes having scoop means for scooping up a feces therebetween and enclosing said feces within said boxes when interfitted; both said boxes being made of corrugated, biogradable cardboard, each box having six sides comprising a wall on each of five said sides while a sixth thereof comprises an opening, an edge of said opening being angularly inclined by one said wall projecting outwardly farthest by protruding farther than an opposite wall thereto so to define a scoop, one of said boxes additionally including a handle die-cut on said furthest projecting wall, said handle being outwardly bendable about a fold line, said handle having a pair of finger-receiving openings therethrough; each said box being formed from a flat, die-cut blank, and one of said five walls which is opposite said opening being comprised of a pair of interfitting and interlocking tabs each of which is formed adjacent an end of said opposite walls, and each said tab includes a minor portion separated from a major portion thereof by a fold line that aligns with a fold line between said walls that form four side walls of said box.

* * * * *